United States Patent [19]
Wolrab

[11] 4,205,514
[45] Jun. 3, 1980

[54] APPARATUS AND PROCESS FOR SEALING MECHANICALLY FORMED FORAGE BALES AND STACKS

[76] Inventor: Milo Wolrab, Wayside Farms, Mount Vernon, Iowa 52314

[21] Appl. No.: 939,251

[22] Filed: Sep. 5, 1978

[51] Int. Cl.² ............................................. A01D 39/00
[52] U.S. Cl. .......................................... 56/341; 100/88
[58] Field of Search ............................ 56/1, 341–343; 426/636, 73; 100/88, 89

[56] References Cited

U.S. PATENT DOCUMENTS

| | | | |
|---|---|---|---|
| 1,996,395 | 4/1935 | Arnold | 426/636 |
| 2,482,635 | 9/1949 | Petering et al. | 426/73 |
| 2,711,962 | 6/1955 | Bickoff | 426/636 |
| 2,716,317 | 8/1955 | McClellan | 56/1 |
| 3,218,786 | 11/1965 | Johnson et al. | 56/1 |
| 3,218,993 | 11/1965 | Forth | 107/14 |
| 3,274,761 | 9/1966 | Soteropulas et al. | 56/1 |
| 3,280,543 | 10/1966 | Lawrence et al. | 56/1 |
| 3,352,229 | 11/1967 | Morse | 100/38 |
| 3,722,197 | 3/1973 | Vermeer | 56/341 |

*Primary Examiner*—Russell R. Kinsey
*Attorney, Agent, or Firm*—Henderson & Sturm

[57] ABSTRACT

A method and apparatus for forming hay bales or the like which are treated as they are formed with an additive substance for sealing, adding nutrients or preventing spoilage of such hay or other forage crop. Spraying apparatus is attached to a hay baling machine in a preferred embodiment of the invention for spraying such a substance on a bale of hay as it is being formed.

8 Claims, 7 Drawing Figures

APPARATUS AND PROCESS FOR SEALING MECHANICALLY FORMED FORAGE BALES AND STACKS

BACKGROUND OF THE INVENTION

It is well known that hay or other forage crop which has been harvested will spoil if exposed to excessive moisture. Accordingly, in the harvest of hay there has been a consistent effort to keep moisture away from such hay. A traditional and still common solution to this problem has been to store such crop inside of a building to prevent rain and other forms of precipitation from entering the hay. Hay stacks have been utilized, whether formed by modern day stacking machines, by the ancient manual pitch fork method or any other method, to store hay outdoors, since a hay stack tends to naturally seal itself on the top thereof if properly formed to thereby prevent rain from penetrating it.

Various other hay packaging and handling systems have been devised, such as the square and round bales. One of the most popular of these forms today is the large round bale which normally weighs in excess of a half of a ton. Certain of these hay packages can be left outside without causing spoilage of the entire package, while other hay packages, for example the small square bale, must be shielded from precipitation because it does not naturally form a seal and allows precipitation to enter it readily.

But even in the stacks and bales designed to be stored outdoors, there is a certain amount of waste which is expected and accepted as being normal. For example, it has been estimated that there is 15-20% spoilage in a large round bale or a stack which has been stored outdoors. Some of this spoilage is at the point of contact with the ground and the other spoilage is normally around the outer several inches of such hay package. Consequently, it can be readily appreciated that there is a need for a method and apparatus for preventing such spoilage of hay due to excess moisture and exposure to the elements.

One of the problems additionally is that certain hay is too wet when formed into a bale or stack and this hay containing excess moisture, when exposed to the air, causes the growth of mold, fungi, mildew or the like. This can also occur to a bale or stack which does not seal out moisture properly for one reason or another. When this happens, animals are normally reluctant to eat such hay, and if they do eat such hay, can suffer adverse effects therefrom. For example, cows have been known to abort from eating such spoiled hay and they have also been known not to "cycle back" for breeding purposes, which all means loss of profits for the farmer and rancher. Consequently there is a need to prevent the occurrence of this type of spoilage and contamination in hay packages.

Another problem with hay or the like is that it is not uniform nutritionally, so that it is quite often necessary to supplement the hay. Even then quite often over or under feeding occurs. This also affects the profits to the livestock producer.

At certain times hay is cut, but before it is formed into a stack or bale, it is rained upon. Unless this hay is quickly dried and packaged, it loses its nutritional value. Consequently there are situations when such hay is only packaged for the purpost of removal from the field so that it does not interfere with the next harvest of such crop. It would be desirable to utilize such hay or the like which has lost its nutritional value by using it as a carrier for nutrients which are applied thereto, if a practical system and apparatus were available for this purpose.

In the June-July 1978 issue, page D8, of Successful Farming Magazine, an article appeared disclosing the use of a device using injector nozzles for releasing gaseous anhydrous ammonia ($NH_3$) into a small square bale as it is being formed for the purpose of adding protein value and having a preservative effect. The use of adding gases to a bale requires injection needles and does not allow it to be merely sprayed on a surface of the hay or on the outside of a bale being formed. Furthermore injection needles could not, as a practical matter, be used on a baler for producing round bales since such balers constantly rotate the bale and provide no opportunity for insertion of injection needles. Such square bales formed with anhydrous ammonia injections also are not sealed to prevent precipitation from entering such bale and must be stored inside to prevent spoilage.

SUMMARY OF THE INVENTION

The present invention relates to a method and apparatus for forming a package of forage crops in the field where such crops are grown, wherein an additive substance is applied to the crops during the process of forming such packages for the purpose of sealing the package from moisture, adding nutrients and/or preventing spoilage.

An object of the present invention is to prevent spoilage of bales or stacks of forage crops such as hay.

Another object of the invention is to seal a package of hay or the like to prevent moisture from entering such package to thereby prevent spoilage and waste of such hay.

A further object of the invention is to add nutrients such as vitamins and minerals to a hay bale or the like to enhance its nutritional value to animals.

A still further object of the invention is to apply a substance to a bale of hay or the like for the purpose of preventing the growth of mold, fungi, mildew or the like.

A still further object of the invention is to provide a method and apparatus for using hay which has lost its nutritional value as a carrier for added nutrients which are applied to such hay.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
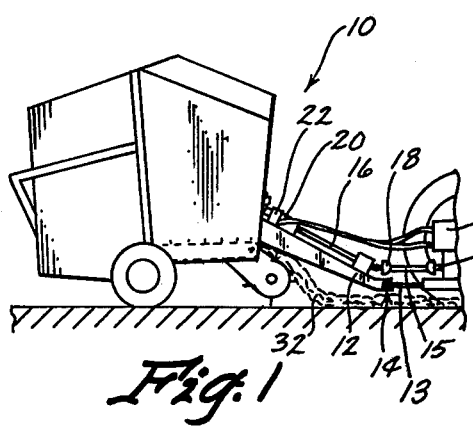
FIG. 1 is a side elevational view of a hay baling apparatus in operation utilizing the present invention.
Figure 2:
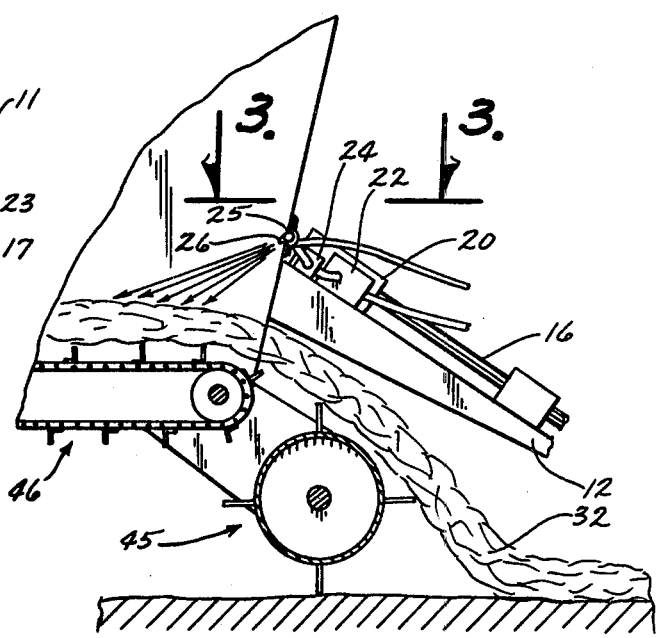
FIG. 2 is an enlarged cross-sectional view showing the invention in greater detail.
Figure 3:
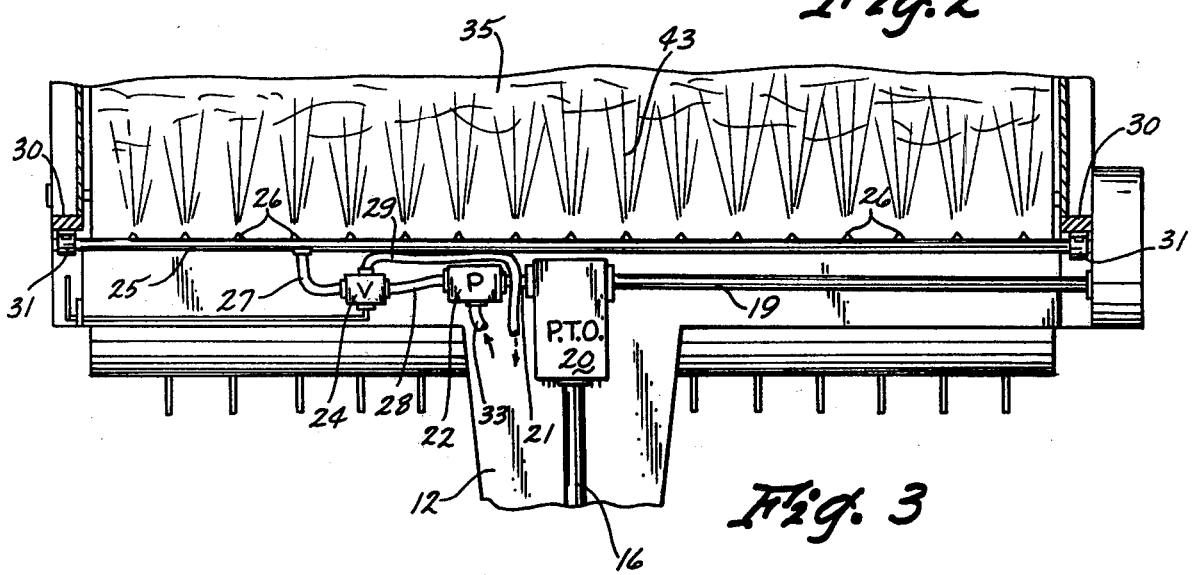
FIG. 3 is a partial enlarged top view taken along line 3—3 of FIG. 2.
Figure 4:
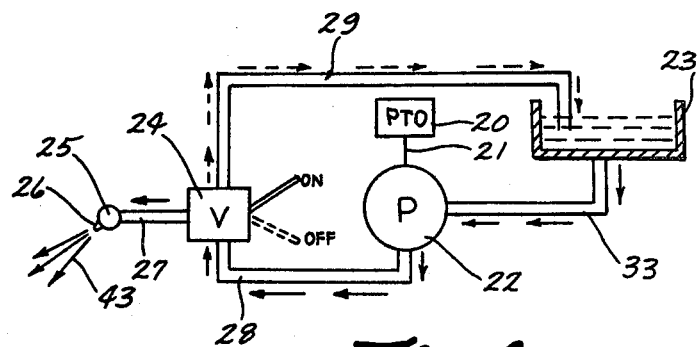
FIG. 4 is a schematic view of the pumping and spraying system of the present invention in one preferred embodiment.

Referring now to the embodiment of FIGS. 1–4 wherein like reference numerals designate identical or corresponding parts throughout the several views, FIG. 1 shows a typical hay baler 10 of the type utilized to form large round bales of hay of the variety of which normally weigh at least one-half of a ton. The hay baling apparatus 10 is drawn and powered by a tractor 11. A tongue 12 attached to the baler 10 is pivotally connected to a draw bar 13 of the tractor by means of a pin joint 14 as is in common usage. The power take-off shaft of the tractor 11 turns a first linkage shaft 15 and a second linkage shaft 16, through universal joints 17 and 18. Rotation of the shaft 16, for example as shown in FIGS. 2 and 3, causes rotation of a shaft 19 for the purpose of operating the baler 10 in a traditional manner through a power take off gear box 20.

An output shaft 21 on the other side of the gear box 20 operates a pump 22 which provides liquid under pressure from a tank 23 (FIG. 4) through a valve 24 to a spraying bar 25 having a plurality of nozzles 26 thereon. A hose 27 connects the sprayer bar 25 to the output of the valve 24 and hoses 28 and 29, respectively, provide for input of fluid to the valve 24 and bypass back to the reservoir 23 when such valve is closed or not fully opened. The sprayer bar 25 is connected to the frame 30 of the baler 10 by means of a clamping structure 31 which can be of any conventional design.

In operation of the embodiment of FIGS. 1–4, the hay 32 or other forage crop would be cut and formed into a windrow in a conventional manner and the baler 10 would also be operated in a completely conventional manner, for example including operation of a crop gathering pick up structure 45 and crop receiving structure 46. If it was desired to merely seal the bale to prevent moisture from entering or exiting the bale, a sealer such as corn oil, soybean oil, digestible paraffin or plastic in a liquid form would be inserted into the tank 23. Then during the last two or three rounds of the bale as it is rotated and formed the valve 24 would be manually or automatically moved to the "on" position so as to spray such sealer on such outer layers of the bale. It is to be understood that this sealer could be sprayed onto the bale at all times from when the bale starts to when it is finished, but it is believed that it would be most economical and feasible to apply such sealer only to the outer portion of such bale. It is possible to have a sprayer bar of many different configurations, for example one which is U-shaped so that it would spray the side of the bale too. It is believed to be preferable, however, not to spray the sides of the bale to allow the bale to "breathe". The sprayer bar could be placed nearly anywhere on a baler or other forage packaging machine to spray such package, and the position shown in the preferred embodiments is to be taken as merely examples of possible placements.

If it is desired to add nutrients such as vitamins and minerals to the hay, then such nutrients would be in the tank 23. It is to be understood, however, that nutrients and sealer could be mixed together if desired or kept separate should a farmer desire only one and not the other. The nutrients would normally be sprayed on the entire bale, but it is again to be understood that it could be sprayed on any portion of the bale desired.

It may also be desirable to spray a substance which prevents the formation of such things as mildew, fungi, or mold, or any other bacteria which is found to cause spoilage or undesirable characteristics in a particular crop. Many other types of substances will suggest themselves to those skilled in the art once the general concept of this invention is understood. Consequently, many substances and methods of application of such substances to a package of forage crop will fall generally within the inventive concept of this invention. For example, the application of such material could be in the form of a dust, rather than a liquid. The particular point of application of a liquid could, for example, be by a sprayer bar mounted on the front of the tractor or even perhaps on a separate tractor moving ahead of the tractor pulling and operating the hay baler or the like.

Even if the forage crop 32 has a high moisture content at the time of baling, if it is completely sealed by applying a sealer to keep the outside air from it, it can store such crop in a way similiar to the storage of wet crops in a silo, except that the expense of a silo would be obviated.

Figure 5:
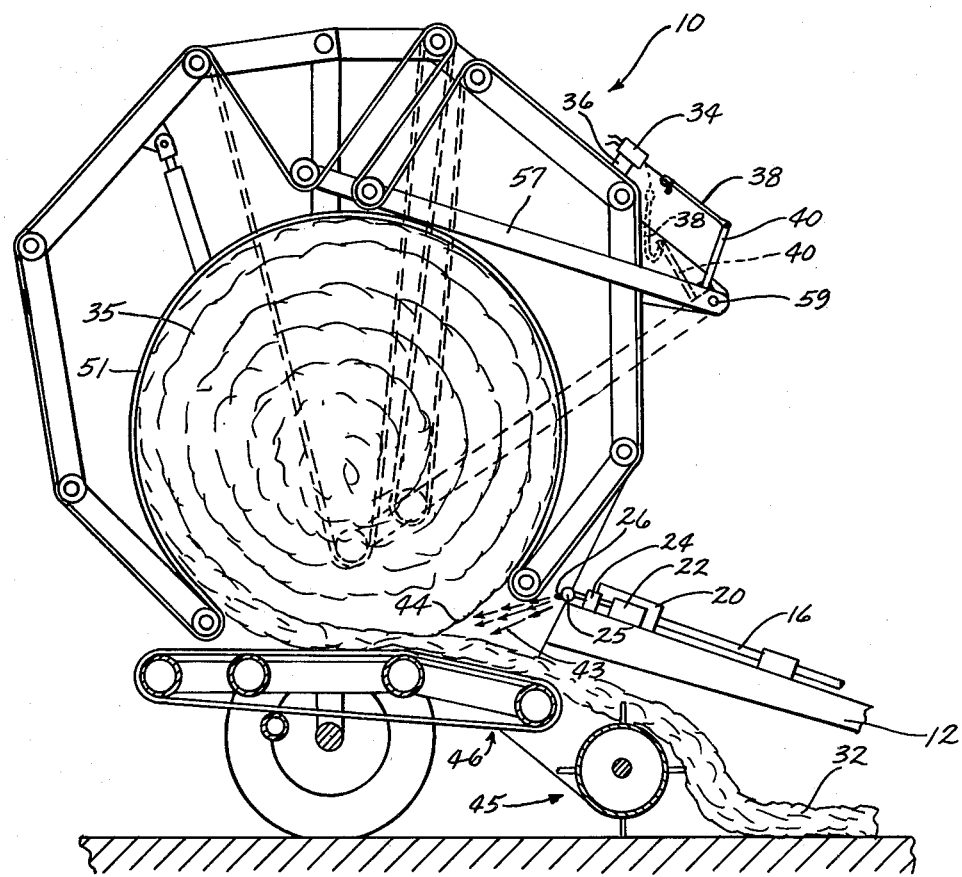
FIG. 5 is a cross-sectional view of a baler showing a second embodiment of the invention.
Figure 6:
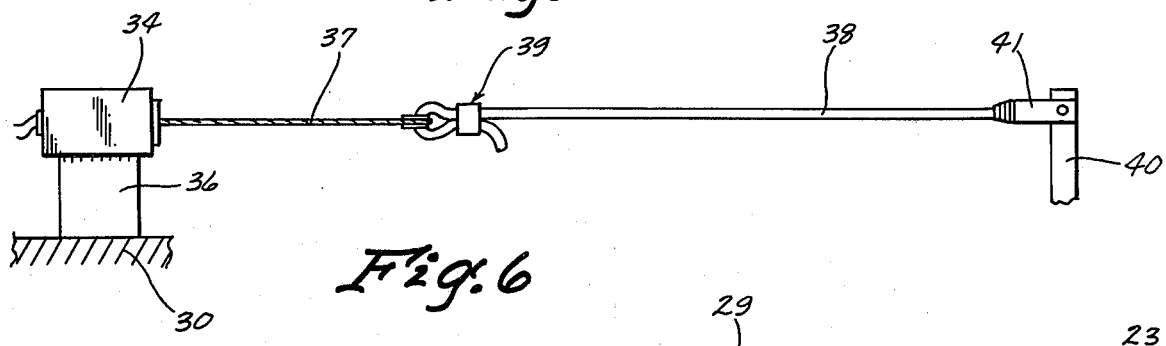
FIG. 6 is an enlarged partial view of the switching apparatus of the present invention.
Figure 7:
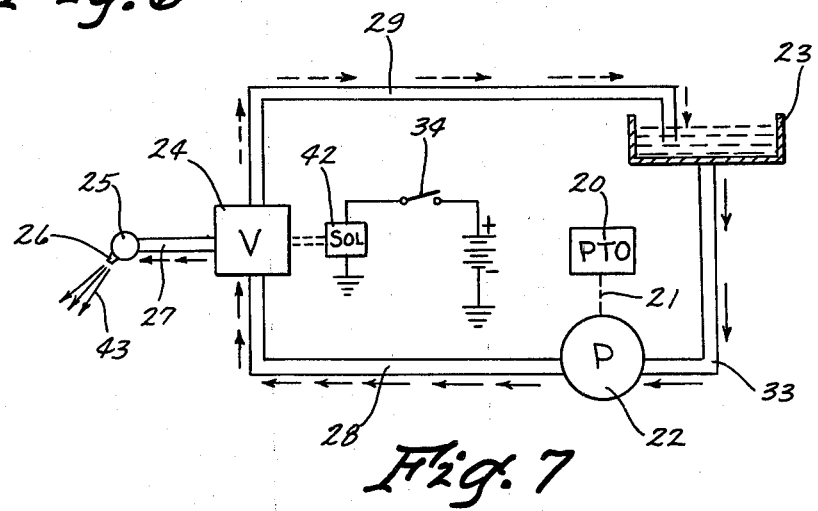
FIG. 7 is a schematic view of the spraying circuit of the FIG. 5 embodiment.

Referring now to FIGS. 5–7, a second embodiment of the present invention is shown. FIG. 5 shows a cross-sectional view of a baler 10 which is substantially identical to the baler disclosed in U.S. Pat. No. 3,722,197, but with the present invention added thereto.

It is noted that in the FIG. 5 embodiment, the sprayer bar 25 is mounted such that it will spray directly onto the bale being formed rather than onto the windrow 32 which is being picked up and before it is made a part of the bale.

A switch 34 is attached to the baler, for example to the frame portion 30 by means of a bracket 36. A cable 37 is connected to the switch and a rubber-like resilient member 38 is connected at one end to the cable 37 by a loop structure 39. The other end of the rubber-like member 38 is attached to a lever 40 through a coupling device 41. The lever 40 is, in turn, rigidly attached to a member 57, which member 57 is conventional and is shown clearly in FIG. 3 of U.S. Pat. No. 3,722,197 which is incorporated herein by reference. This member 57 moves from the position shown in dashed lines in FIG. 5, when the bale is just beginning upwardly, to the position shown in solid lines in FIG. 5. This member 57 will pivot further about a point 59 as the bale continues to get larger.

In operation, the embodiment of FIG. 5 would be utilized very similarily to the embodiment of FIGS. 1–4. For example, a tractor would be connected to the baler 10, and the power for the baler 10 would be supplied through a power-take-off shaft 16 connected to the tractor. Again, a transfer case 20 would be used to run the baler through one output shaft, and turn the pump 22 through another output shaft. The valve 24 is controlled by an electrical solenoid 42, which solenoid 42 causes the valve 24 to open and allow spray to be emitted from the nozzles 26 when the switch 34 is closed, and the solenoid and valve are biased to a closed position such that the valve 24 will be closed when the switch 34 is open.

To use the invention of FIG. 5 in an automatic mode, the bale 35 would be in the process of being formed with the crop gathering structure 45 and the crop receiving structure 46 in operation as is well known, and as is being formed, the member 57 would be in the position shown in dashed lines in FIG. 5. At this time, the switch 34 would be open because it is biased to an open position, so consequently the valve 24 would be closed and no spraying would be occuring then. As the bale 35 continues to grow in size with the addition of more and more hay, its size would gradually get to be approximately of the size in FIG. 5, at which time the gradual movement of the member 57 would cause corresponding movement of the lever 40, which would, in turn, cause the cable 37 to be pulled to a tight position such as shown in FIGS. 5 and 6. The fact that the member 38 has some resiliency in it prevents breakage of the cable 37 or part of the switch 34 and still insures that the switch will be closed when member 57 moves to the position shown in solid lines in FIG. 5. It will be readily appreciated that by varying the length of either the cable 37, the member 38 or the position of the lever 40, the timing of the turning on and off the switch 34 can be varied.

Assuming it is a sealing material that is to be applied to the bale 35, then it might be desired to apply such sealant only to the last three inches of the bale. Consequently the sprayer nozzles 26 would be emitting such sealant only during the last three inches of formation of the bale 35 and this function would be done automatically. It will be understood to those skilled in the art that the bale 35 turns constantly as it is being formed so that the spray 43 from the nozzle 26 will strike the bale at the approximate point 44 and cover the entire outer periphery of the bale. Once the bale is completely formed, but before it is ejected from the baler 10, it will be turned several times to wrap the twine around it to securely hold it together. During this time it is preferred that the spray nozzel 26 continue to spray the sealant around the entire periphery of the bale, and this will automatically be done with the structure shown in FIGS. 5—7. Then once the bale 35 is ejected from the baler 10, the member 57 will move back to the position shown in dashed lines in FIG. 5 and this will shut off the switch 34 and close the valve 24. Then when the next bale is formed, it will automatically be turned on again during the last stages of formation of the bale 35 and then turned off again once the bale 35 is ejected from the baler 10.

It is noted that the spray 43 can be sprayed directly onto the exterior of the bale 35, onto the portion of the hay 32 which is not yet a part of the bale or a combination such. The sprayer bar 25 could, for example, be almost anywhere else on the baler, such as above the bale, but it is believed to be desirable not to spray the material 43 directly onto the belts 51 of such a baler. It appears to be desirable to spray the sealant directly on the outer surface of the bale, for example at point 44, and to spray nutrients on the inside of each of such layer, for example as shown in FIG. 2.

Obviously many modifications and variations of the present invention are possible in light of the above teachings. For example a timer could be used to turn on the sprayer and leave it on for only a certain period of time. It is therefore to be understood that, within the scope of the appended claims, the invention may be practiced otherwise than as specifically described.

I claim:

1. Forage packaging apparatus comprising:
   frame means adapted to move along the ground;
   crop gathering means attached to said frame means for picking up forage crops from the ground;
   receiving means attached to said frame means for receiving said gathered forage crops and forming a package of said forage crops; and
   means attached to said apparatus for spraying a substance on to the exterior of said package while said package is being formed, said substance including means for substantially sealing water out from said package.

2. The apparatus of claim 1 wherein said spraying means is attached to said frame means.

3. The apparatus of claim 1 wherein said substance includes nutritional materials.

4. The apparatus of claim 1 wherein said substance includes vitamins and minerals.

5. The apparatus of claim 1 wherein said applying means includes spraying means for spraying said substance in liquid form onto said crops.

6. The apparatus of claim 1 wherein said crop gathering means and receiving means are part of a baling machine means for forming large round bales.

7. The apparatus of claim 6 including means for automatically turning said spraying means on when a bale attains a predetermined size and automatically shutting said spraying means off when said bale is ejected from said baling machine means.

8. The apparatus of claim 6 wherein said substance comprises oil.

* * * * *